(12) United States Patent
Talach et al.

(10) Patent No.: US 8,799,086 B2
(45) Date of Patent: Aug. 5, 2014

(54) PAYMENT FACILITATING SYSTEM FOR USE WITH A MOBILE COMMUNICATOR UTILIZING A NEAR FIELD COMMUNICATION (NFC) LINK

(75) Inventors: David Paul Talach, Sacramento, CA (US); Mehran Mirkazemi-Moud, Rocklin, CA (US); Christopher Hugh Delgado, Rocklin, CA (US)

(73) Assignee: Verifone, Inc., San Jose, CA (US)

( * ) Notice: Subject to any disclaimer, the term of this patent is extended or adjusted under 35 U.S.C. 154(b) by 5 days.

(21) Appl. No.: 13/191,973

(22) Filed: Jul. 27, 2011

(65) Prior Publication Data
US 2013/0030933 A1    Jan. 31, 2013

(51) Int. Cl.
*G06Q 40/00*    (2012.01)

(52) U.S. Cl.
USPC .......................................................... 705/17

(58) Field of Classification Search
None
See application file for complete search history.

(56) References Cited

U.S. PATENT DOCUMENTS

| | | | |
|---|---|---|---|
| 7,110,792 | B2 | 9/2006 | Rosenberg |
| 2003/0172028 | A1 | 9/2003 | Abell et al. |
| 2003/0220881 | A1 | 11/2003 | Pirhonen et al. |
| 2007/0156436 | A1 | 7/2007 | Fisher et al. |
| 2007/0278290 | A1 | 12/2007 | Messerges et al. |
| 2008/0051059 | A1 | 2/2008 | Fisher |
| 2010/0088188 | A1 | 4/2010 | Kumar et al. |
| 2010/0161403 | A1 | 6/2010 | Fisher et al. |
| 2010/0274677 | A1 | 10/2010 | Florek et al. |
| 2011/0112918 | A1 | 5/2011 | Mestre |
| 2011/0264543 | A1 | 10/2011 | Taveau et al. |
| 2011/0320291 | A1* | 12/2011 | Coon .............................. 705/16 |

FOREIGN PATENT DOCUMENTS

| | | |
|---|---|---|
| CN | 101567108 A | 10/2009 |
| CN | 102256001 A | 11/2011 |
| KR | 10-2009-0121497 A | 11/2009 |
| TW | M416824 U1 | 11/2011 |
| WO | WO 2009/129749 A | 10/2009 |
| WO | WO 2011/112158 A1 | 9/2011 |

OTHER PUBLICATIONS

An International Search Report and a Written Opinion both dated Oct. 10, 2012, which issued during the prosecution of Applicant's PCT/IL2012/047962.

* cited by examiner

*Primary Examiner* — Shay S Glass
(74) *Attorney, Agent, or Firm* — Sughrue Mion, PLLC

(57) ABSTRACT

A payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data for use in a financial transaction, a non-NFC financial transaction communication link between the mobile communicator and the POS terminal, the non-NFC financial transaction communication link being operative to communicate non-NFC data for use in the financial transaction, and a transaction effector operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link.

14 Claims, 3 Drawing Sheets

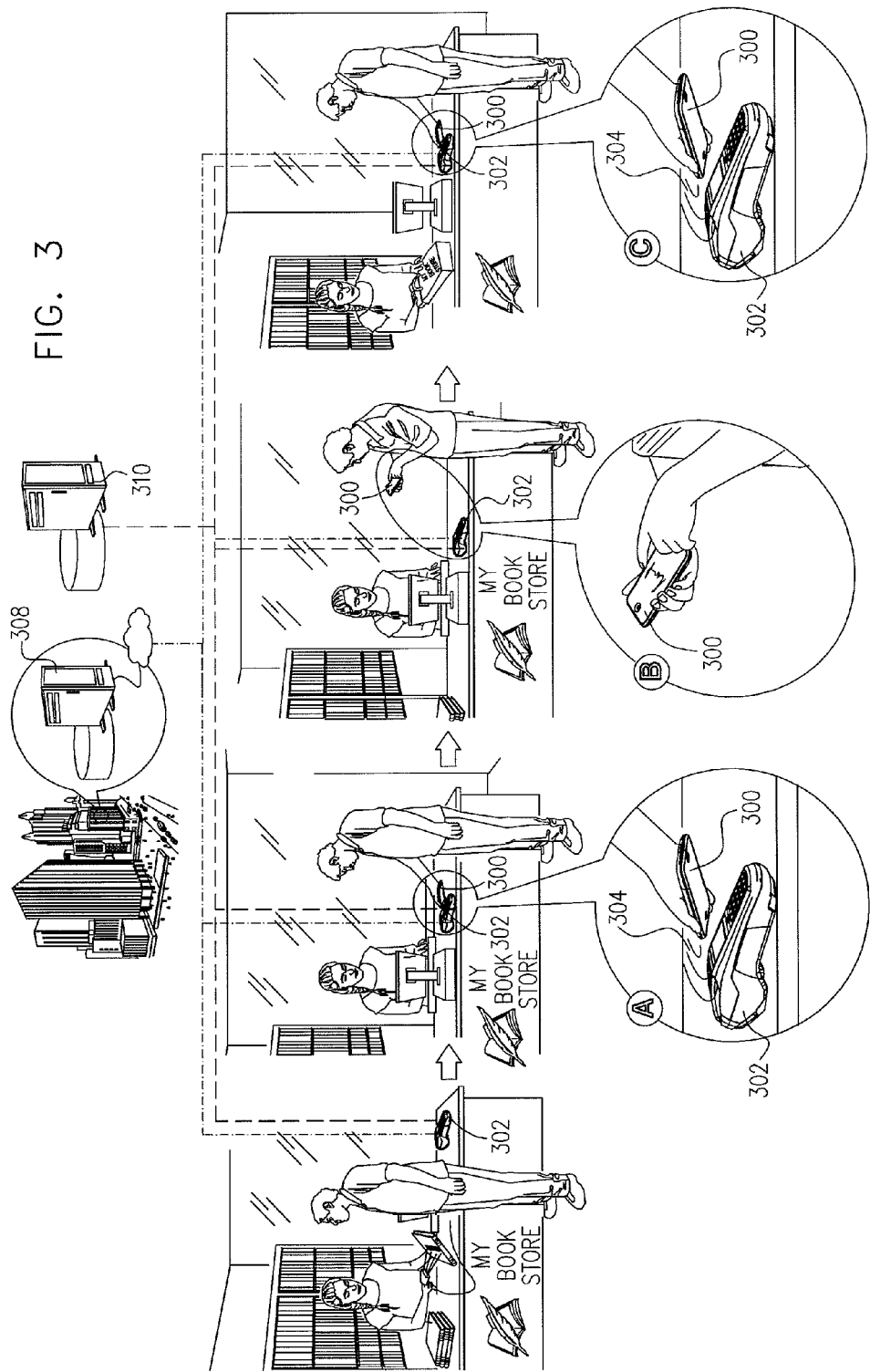

US 8,799,086 B2

PAYMENT FACILITATING SYSTEM FOR USE WITH A MOBILE COMMUNICATOR UTILIZING A NEAR FIELD COMMUNICATION (NFC) LINK

FIELD OF THE INVENTION

The present invention relates to payment systems and methodologies generally.

BACKGROUND OF THE INVENTION

The following patent publications are believed to represent the current state of the art:
United States Patent Application Publication No. 2010/0161403; and
U.S. Pat. No. 7,110,792.

SUMMARY OF THE INVENTION

The present invention seeks to provide improved payment systems and methodologies.

There is thus provided in accordance with a preferred embodiment of the present invention a payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data for use in a financial transaction, a non-NFC financial transaction communication link between the mobile communicator and the POS terminal, the non-NFC financial transaction communication link being operative to communicate non-NFC data for use in the financial transaction, and a transaction effector operative to complete the financial transaction using both the NFC data communicated directly between the mobile communicator and the POS terminal over the NFC financial transaction communication link and the non-NFC data communicated directly between the mobile communicator and the POS terminal over the non-NFC financial transaction communication link.

Preferably, the non-NFC financial transaction communication link is a wireless link.

In accordance with a preferred embodiment of the present invention the transaction effector is embodied in at least one of the POS terminal, a transaction server and a store server.

In accordance with a preferred embodiment of the present invention the transaction effector is embodied in the POS terminal and provides a transaction completion output to at least one of the transaction server and the store server. Alternatively, the transaction effector is embodied in the transaction server and receives payment card data from the POS terminal and additional data from at least one of the POS terminal and the store server. In another alternative embodiment, the transaction effector is embodied in the store server and provides at least payment card data to the transaction server.

Preferably, the NFC data and the non-NFC data include at least one identifier useful for associating NFC data and non-NFC data pertaining to the same transaction.

In accordance with a preferred embodiment of the present invention the financial transaction is a payment card transaction. Additionally, the payment card transaction is either a credit card transaction or a debit card transaction.

There is also provided in accordance with another preferred embodiment of the present invention a payment facilitating system for use with a mobile communicator and a point of sale (POS) terminal, the system including a Near Field Communication (NFC) financial transaction communication link between the mobile communicator and the POS terminal, the NFC financial transaction communication link being operative to communicate NFC data between the mobile communicator and the POS terminal for use in a financial transaction and a transaction effector operative to complete the financial transaction using the NFC data communicated over the NFC financial transaction communication link between the mobile communicator and the POS terminal in at least two separate NFC sessions.

In accordance with a preferred embodiment of the present invention the financial transaction is a payment card transaction. Additionally, the payment card transaction is either a credit card transaction or a debit card transaction.

Preferably, the transaction effector is embodied in at least one of the POS terminal, a transaction server and a store server.

In accordance with a preferred embodiment of the present invention the transaction effector is embodied in the POS terminal and provides a transaction completion output to at least one of the transaction server and the store server. Alternatively, the transaction effector is embodied in the transaction server and receives payment card data from the POS terminal and additional data from at least one of the POS terminal and the store server. In another alternative embodiment, the transaction effector is embodied in the store server and provides at least payment card data to the transaction server.

There is further provided in accordance with yet another preferred embodiment of the present invention a card-present payment facilitating system including a Near Field Communication (NFC) communicator communicating with a mobile communicator over a secure link via near field communication and a signature transmission enabled mobile communicator operative to transmit a signature to a point of sale terminal via a non-NFC data link.

There is even further provided in accordance with still another preferred embodiment of the present invention a method for effecting a card-present payment card transaction including transmitting payment card data via Near Field Communication (NFC) communication between an NFC-enabled point of sale (POS) terminal and an NFC-enabled mobile communicator and transmitting a signature from the mobile communicator to the POS terminal via non-NFC communication.

Preferably, the method for effecting a card-present payment card transaction also includes transmitting additional data relating to the payment card transaction via NFC communication. Additionally or alternatively, the method for effecting a card-present payment card transaction also includes transmitting additional data relating to the payment card transaction via non-NFC communication.

BRIEF DESCRIPTION OF THE DRAWINGS

The present invention will be understood and appreciated more fully from the following detailed description taken in conjunction with the drawings in which:

FIG. 3 is a simplified pictorial illustration of the operation of a payment facilitating system constructed and operative in accordance with yet another preferred embodiment of the present invention.

DETAILED DESCRIPTION OF PREFERRED EMBODIMENTS

Figure 1:
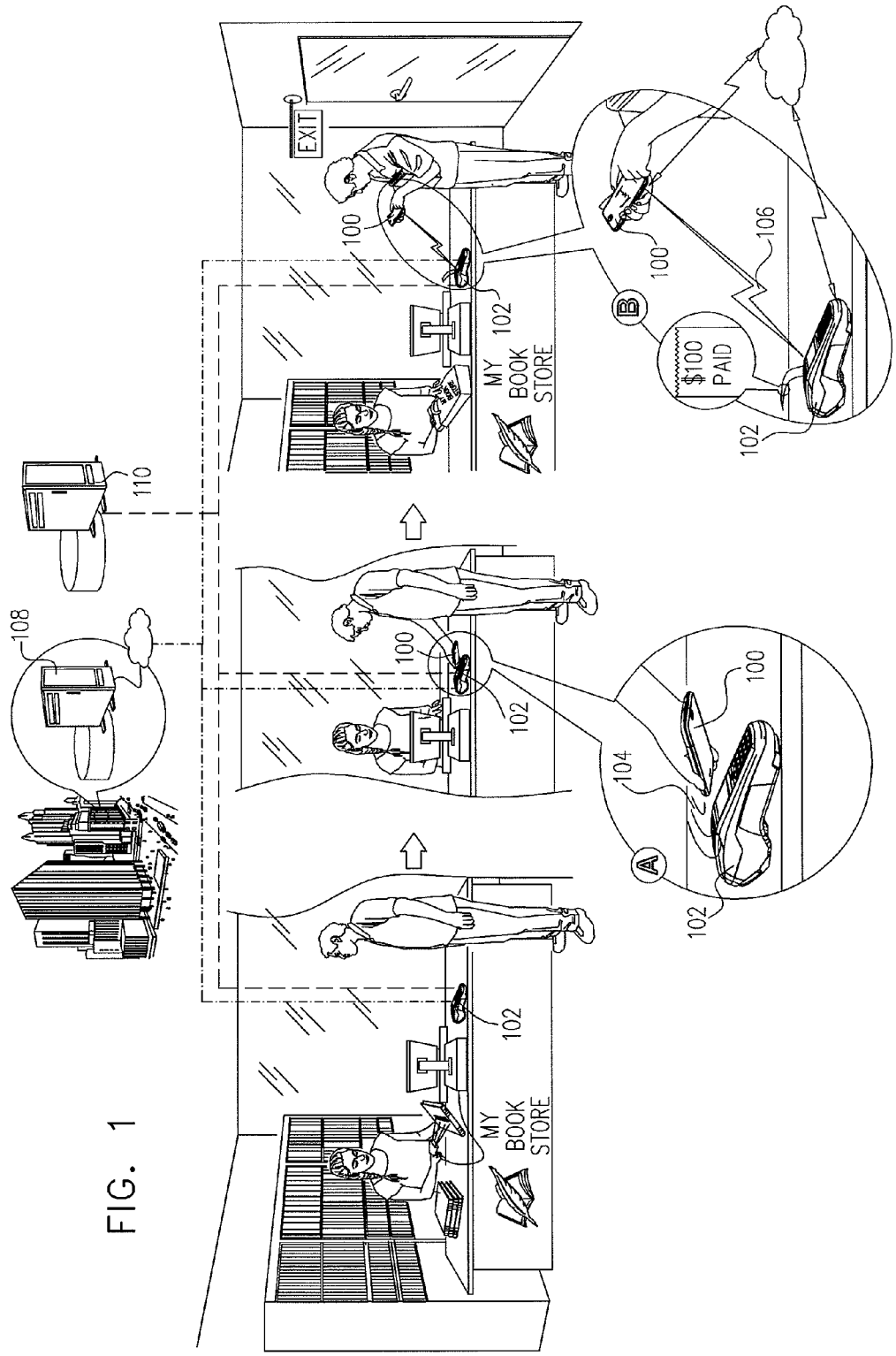
FIG. 1 is a simplified pictorial illustration of the operation of a payment facilitating system constructed and operative in accordance with a preferred embodiment of the present invention.

Reference is now made to FIG. 1, which is a simplified pictorial illustration of the operation of a payment facilitating system constructed and operative in accordance with a preferred embodiment of the present invention.

As seen in FIG. 1, a purchaser of books places the books on a sales counter. The bar codes of the books are scanned by a sales assistant, who enters the sales information using a cash register. The purchaser is directed to place his Near Field Communication capable mobile communicator 100, such as an IPHONE having Near Field Communication (NFC) functionality, in NFC propinquity to NFC-enabled point of sale (POS) terminal 102 having Near Field Communication (NFC) functionality, which is also preferably enabled for non-NFC communication, such as WIFI, GPRS and Bluetooth.

The term "NFC propinquity" is used throughout to refer to propinquity which enables Near Field Communication (NFC) to take place between the mobile communicator 100 and POS terminal 102, typically between 2-4 cm. Examples of an NFC-enabled POS terminal are a MX870, VX810 and PINPAD 1000, all commercially available from Verifone, Inc. It is appreciated that alternatively the cash register may function as an NFC-enabled POS. The act of placing a mobile communicator 100 within NFC propinquity of a POS 102, for establishing a NFC communication link 104 therewith, is termed "tapping" and is illustrated in FIG. 1 at A. An audio or visual indication is preferably provided to indicate a successful tap.

The tapping is operative to communicate at least payment card data from the customer's mobile communicator 100 directly to the POS terminal 102. Preferably, a transaction identifier is also communicated directly to the POS terminal 102 for enabling association of a subsequent non-NFC communication therewith.

The customer may then move his mobile communicator 100 out of NFC propinquity with the NFC-enabled POS terminal 102, thereby breaking the NFC communication link.

In the meantime a non-NFC communication link 106 is established directly between mobile communicator 100 and NFC-enabled POS terminal 102. The customer typically receives a signature prompt on his mobile communicator 100 via the non-NFC communication link 106. He signs and/or enters a code on the keypad of his mobile communicator and accepts the transaction using his mobile communicator 100. This information, together with a suitable transaction identifier, is communicated directly to POS terminal 102, typically via the non-NFC communication link 106. Typically, a receipt is printed, as illustrated in FIG. 1 at B. The NFC communicated data, such as the customer's credit/debit card data and the non-NFC communicated data, such as the customer's signature, are supplied, together with the purchase data from the POS terminal 102, to a transaction effector, which completes the purchase transaction. In the meantime, the purchased goods are wrapped and handed to the customer together with the receipt. Alternatively, the transaction receipt may be paperless and displayed on communicator 100 or emailed to the customer and/or be in any other suitable form.

It is appreciated that the NFC-enabled POS terminal 102 preferably communicates in a wired or wireless manner with one or more store servers 108, which preferably provide inventory and pricing data and with one or more transaction servers 110 which provide transaction functionality, such as interaction with a credit/debit card clearinghouse.

The transaction effector is preferably embodied in the POS terminal 102 and may alternatively be wholly or partially embodied in at least one of transaction server 110 and store server 108. Preferably, the signature data is retained in POS terminal 102 and/or store server 108 and only the payment card data and the purchase data are provided to transaction server 110 by the transaction effector.

Preferably, POS terminal 102 and, optionally, store server 108 and/or transaction server 110 employ transaction identifiers communicated in both the NFC and non-NFC communications for associating data relating to the same transaction. One example of a suitable transaction identifier is the telephone number of mobile communicator 100.

It is appreciated that the provision of a signature in an NFC transaction is particularly beneficial since it enables the transaction to be considered a card-present transaction.

In addition to, or in place of, the signature of the customer, other types of data may be communicated via the non-NFC communication link between the mobile communicator 100 and POS terminal 102. Such data may include membership club information, coupon information, receipts and advertising.

It is a particular feature of this embodiment of the present invention that provision of a non-NFC data link enables the communication of information directly between mobile communicator 100 and POS terminal 102, such as a customer's signature written by the customer onto a touchpad on his mobile communicator 100, which cannot be generated without breaking the NFC connection.

In accordance with another preferred embodiment of the invention, once the NFC communication link is set up, information regarding the customer's affiliations and entitlements, such as club memberships, discounts and coupons, may be exchanged via the NFC link. Based, inter alia, on this information, suitable pricing and discounts may be applied to the transaction. Suitable transaction-based updates regarding the customer's entitlements, such as club memberships, discounts and coupons, may be exchanged via the NFC link or the non-NFC link. Preferably both the NFC and non-NFC communications are secure.

If it is desired that a session be secure, a suitable key or suitable keys may be communicated between of the POS 102 and the mobile communicator 100 in one or both directions for enabling encryption and decryption of the data communicated.

Figure 2:
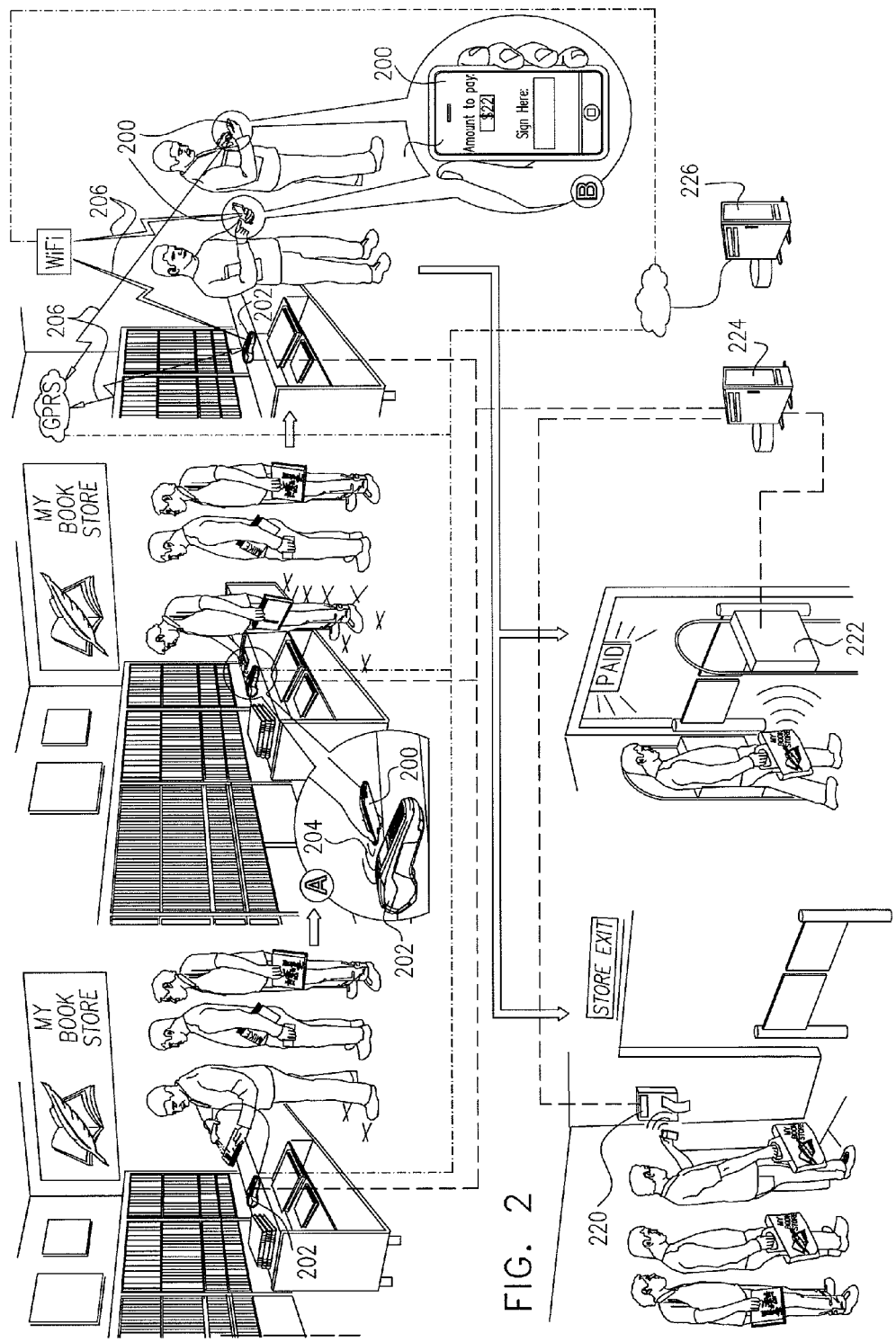
FIG. 2 is a simplified pictorial illustration of the operation of a payment facilitating system constructed and operative in accordance with another preferred embodiment of the present invention.

Reference is now made to FIG. 2, which is a simplified pictorial illustration of the operation of a payment facilitating system constructed and operative in accordance with another preferred embodiment of the present invention.

As seen in FIG. 2, there is no sales person present. The bar codes or RFIDs of the books are scanned by the customer and the transaction amount preferably appears on a display. Once scanning is completed, the customer is prompted to tap his mobile communicator 200 onto a NFC-enabled POS terminal 202, which is preferably connected to, but separate from, a cash register (not shown), which preferably is also enabled for non-NFC communication, such as WIFI, GPRS and Bluetooth. Alternatively, the NFC-enabled POS terminal 202 may also include cash register functionality. The tapping preferably employs a NFC communications link 204 and requires that the mobile communicator 200 be within NFC propinquity with the NFC-enabled POS terminal 202, as illustrated in FIG. 2 at A. An audio or visual indication is preferably provided to indicate a successful tap.

The tapping is operative to communicate at least payment card data from the customer's mobile communicator 200 directly to the POS terminal 202. Preferably, a transaction identifier is also communicated directly to the POS terminal 202 for enabling association of a subsequent non-NFC communication therewith.

The customer may then move away from the NFC-enabled POS terminal 202 and thus out of NFC propinquity therewith, thereby breaking the NFC link.

In the meantime, a non-NFC communication link 206 is established directly between mobile communicator 200 and NFC-enabled POS terminal 202, which preferably is also enabled for non-NFC communication, such as WIFI, GPRS and Bluetooth. The customer typically receives a signature prompt on his mobile communicator 200 via the non-NFC communication link 206, as illustrated in FIG. 2 at B. The customer signs and accepts the transaction using his mobile communicator 200. This information is communicated directly to the POS terminal 202, typically via the non-NFC communication link 206. The NFC communicated data, such as the customer's credit/debit card data and the non-NFC communicated data, such as the customer's signature, are supplied, together with the purchase data from the POS terminal 202, to a transaction effector, which completes the purchase transaction.

In the meantime, the customer takes the purchased goods and approaches the store exit, where he again taps his mobile communicator 200 on another NFC-enabled terminal 220, coupled to NFC-enabled POS terminal 202. In response to this second tap, a transaction receipt is printed.

Optionally, a manned or unmanned inventory control device 222 may be located at the store exit and may scan the RFIDs of the products sought to be removed from the store and compare the particulars of the products with those appearing on the transaction receipt. Only if the payments match the scanned RFIDs is exit from the store permitted.

It is appreciated that the NFC-enabled terminals 202 and 220, as well as optional inventory control device 222, all preferably communicate in a wired or wireless manner with one or more store servers 224, which preferably provide inventory and pricing data, and with one or more transaction servers 226, which provide transaction functionality, such as interaction with a credit/debit card clearinghouse.

The transaction effector is preferably embodied in the POS terminal 202 and may alternatively be wholly or partially embodied in at least one of POS terminal 202, transaction server 226 and store server 224. Preferably, the signature data is retained in POS terminal 202 and/or store server 224 and only the payment card data and the purchase data are provided to transaction server 226 by the transaction effector.

Preferably, POS terminal 202 and optionally, NFC-enabled terminal 220, optional inventory control device 222, store server 224 and/or transaction server 226 employ transaction identifiers communicated in both the NFC and non-NFC communications for associating data relating to the same transaction. One example of a suitable transaction identifier is the telephone number of mobile communicator 200.

It is appreciated that the provision of a signature in an NFC transaction is particularly beneficial since it enables the transaction to be considered a card-present transaction.

In addition to, or in place of, the signature of the customer, other types of data may be communicated via the non-NFC communication link between mobile communicator 200 and POS terminal 202. Such data may include membership club information, coupon information, receipts and advertising.

It is a particular feature of this embodiment of the present invention that provision of a non-NFC data link enables the communication of information directly between mobile communicator 200 and POS terminal 202, such as a customer's signature written by the customer onto a touchpad on his mobile communicator 200, which cannot be generated without breaking the NFC connection.

In accordance with another preferred embodiment of the invention, once the NFC communication link is set up, information regarding the customer's affiliations and entitlements, such as club memberships, discounts and coupons, may be exchanged via the NFC link. Based, inter alia, on this information, suitable pricing and discounts may be applied to the transaction. Suitable transaction-based updates regarding the customer's entitlements, such as club memberships, discounts and coupons, may be exchanged via the NFC link or the non-NFC link. Preferably both the NFC and non-NFC communications are secure.

If it is desired that a session be secure, a suitable key or suitable keys may be communicated between of POS terminal 202 and mobile communicator 200 in one or both directions for enabling encryption and decryption of the data communicated.

Reference is now made to FIG. 3, which is a simplified pictorial illustration of the operation of a payment facilitating system constructed and operative in accordance with another preferred embodiment of the present invention.

As seen in FIG. 3, a purchaser of books places the books on a sales counter. The bar codes of the books are scanned by a sales assistant, who enters the sales information using a cash register. The purchaser is directed to place his Near Field Communication capable mobile communicator 300, such as an IPHONE having Near Field Communication (NFC) functionality, in NFC propinquity to NFC-enabled point of sale (POS) terminal 302 having Near Field Communication (NFC) functionality. The term "NFC propinquity" is used throughout to refer to propinquity which enables Near Field Communication (NFC) to take place between the mobile communicator 300 and POS terminal 302, typically between 2-4 cm. Examples of an NFC-enabled POS are a MX870, VX810 and PINPAD 1000, all commercially available from Verifone, Inc. It is appreciated that alternatively the cash register may function as an NFC-enabled POS. The act of placing a mobile communicator 300 within NFC propinquity of a POS 302, for establishing a NFC communication link 304 therewith, is termed "tapping" and is illustrated in FIG. 3 at A. An audio or visual indication is preferably provided to indicate a successful tap.

The customer typically receives a signature prompt on his mobile communicator 300 via the NFC communication link 304. The customer may then move his mobile communicator 300 out of NFC propinquity with the NFC-enabled POS terminal 302, thereby breaking the NFC communication link.

The customer signs and accepts the transaction using his mobile communicator 300, as illustrated in FIG. 3 at B, and again places his mobile communicator 300 in NFC propinquity with the NFC-enabled POS terminal 302, thereby re-establishing an NFC communication link, as illustrated in FIG. 3 at C. This signature data is communicated to the POS via the NFC communication link 304. In the meantime, the purchased goods are wrapped and handed to the customer together with a receipt.

Preferably upon re-establishment of the NFC communication link between the mobile communicator 300 and POS terminal 302, the later NFC communication session is automatically associated with the earlier session relating to the same transaction, notwithstanding termination of the earlier session due to removal of mobile communicator 300 from NFC propinquity with POS terminal 302.

The NFC communicated data from both communication sessions, such as the customer's credit/debit card data and the customer's signature, are supplied, together with the purchase data from the POS terminal 302, to a transaction effector, which completes the purchase transaction. In the meantime, the purchased goods are wrapped and handed to the customer together with a receipt. Alternatively, the transaction receipt may be paperless and displayed on communicator 300 or emailed to the customer and/or be in any other suitable form.

It is appreciated that the NFC-enabled POS terminal 302 communicates in a wired or wireless manner with one or more store servers 308, which preferably provide inventory and pricing data, and with one or more transaction servers 310, which provide transaction functionality, such as interaction with a credit/debit card clearinghouse.

The transaction effector is preferably embodied in POS terminal 302. Alternatively, the transaction effector may be partially or wholly embodied in at least one of transaction server 310 and store server 308. Preferably, the signature data is retained in POS terminal 302 and/or store server 308 and only the payment card data and the purchase data are provided to transaction server 310 by the transaction effector.

POS terminal 302, store server 308 and/or transaction server 310 preferably employ transaction identifiers communicated in both NFC communication sessions for associating data relating to the same transaction. One example of a suitable transaction identifier is the telephone number of mobile communicator 300.

It is appreciated that the provision of a signature in an NFC transaction is particularly beneficial since it enables the transaction to be considered a card-present transaction.

In addition to, or in place of, the signature of the customer, other types of data may be communicated via the NFC communication link. Such data may include membership club information, coupon information, receipts and advertising.

It is a particular feature of this embodiment of the present invention that the automatic association of the latter NFC communication session with the earlier NFC communication session between the mobile communicator 300 and the POS terminal 302 relating to the same transaction, notwithstanding termination of the earlier session due to removal of mobile communicator 300 from NFC propinquity with POS terminal 302, enables the communication of information, such as a customer's signature written by the customer onto a touchpad on his mobile communicator 300, which cannot be generated without breaking the NFC connection.

In accordance with another preferred embodiment of the invention, once the NFC communication link is set up, information regarding the customer's affiliations and entitlements, such as club memberships, discounts and coupons, may be exchanged via the NFC link. Based, inter alia, on this information, suitable pricing and discounts may be applied to the transaction. Suitable transaction-based updates regarding the customer's entitlements, such as club memberships, discounts and coupons, may also be exchanged via the NFC link. Preferably, the NFC communications are secure.

If it is desired that a session be secure, a suitable key or suitable keys may be communicated between of POS 302 and mobile communicator 300 in one or both directions for enabling encryption and decryption of the data communicated.

It will be appreciated by persons skilled in the art that the present invention is not limited by what has been particularly shown and described hereinabove. Rather the scope of the present invention includes both combinations and sub-combinations of various features described hereinabove as well as modifications thereof which would occur to a person skilled in the art upon reading the foregoing and which are not in the prior art.

The invention claimed is:

1. A payment facilitating system for use with a Near Field Communication (NFC)-enabled mobile communicator and an NFC-enabled point of sale (POS) terminal, said system comprising:
   a Near Field Communication (NFC) financial transaction communication link between said NFC-enabled mobile communicator and said NFC-enabled POS terminal, said NFC financial transaction communication link being operative to communicate NFC data for use in a financial transaction;
   a non-NFC financial transaction communication link between said NFC-enabled mobile communicator and said NFC-enabled POS terminal, said non-NFC financial transaction communication link being operative to communicate non-NFC data for use in said financial transaction, said non-NFC data including data derived from a handwritten human signature; and
   a transaction effector operative to complete said financial transaction using both said NFC data communicated directly between said NFC-enabled mobile communicator and said NFC-enabled POS terminal over said NFC financial transaction communication link and said non-NFC data communicated directly between said NFC-enabled mobile communicator and said NFC-enabled POS terminal over said non-NFC financial transaction communication link.

2. A payment facilitating system according to claim 1 and wherein said non-NFC financial transaction communication link is a wireless link.

3. A payment facilitating system according to claim 1 and wherein said transaction effector is embodied in at least one of said POS terminal, a transaction server and a store server.

4. A payment facilitating system according to claim 3 and wherein said transaction effector is embodied in said POS terminal and provides a transaction completion output to at least one of said transaction server and said store server.

5. A payment facilitating system according to claim 3 and wherein said transaction effector is embodied in said transaction server and receives payment card data from said POS terminal and additional data from at least one of said POS terminal and said store server.

6. A payment facilitating system according to claim 3 and wherein said transaction effector is embodied in said store server and provides at least payment card data to said transaction server.

7. A payment facilitating system according to claim 1 and wherein said NFC data and said non-NFC data include at least one identifier useful for associating NFC data and non-NFC data pertaining to the same transaction.

8. A payment facilitating system according to claim 1 and wherein said financial transaction is a payment card transaction.

9. A payment facilitating system according to claim 8 and wherein said payment card transaction is either a credit card transaction or a debit card transaction.

10. A card-present payment facilitating system comprising:
    a Near Field Communication (NFC)-enabled communicator; and an NFC-enabled mobile communicator communicating with said NFC-enabled a communicator over a secure link via near field communication; and said NFC-enabled mobile communicator being a signature transmission enabled mobile communicator operative to transmit data derived from a handwritten human signature to said NFC-enabled communicator via a non-NFC data link.

11. A method for effecting a card-present payment card transaction comprising:

establishing a Near Field Communication (NFC) connection and transmitting payment card data via NFC communication between an NFC-enabled point of sale (POS) terminal and an NFC-enabled mobile communicator when said NFC-enabled POS terminal and said NFC-enabled mobile communicator are in NFC propinquity;

thereafter mutually displacing said NFC-enabled POS terminal and said NFC-enabled mobile communicator such that they are no longer in NFC propinquity, thereby breaking said NFC connection; and thereafter transmitting data derived from a handwritten human signature from said mobile communicator to said POS terminal via non-NFC communication when said NFC-enabled POS terminal and said NFC-enabled mobile communicator are not in NFC propinquity.

12. A method for effecting a card-present payment card transaction according to claim 11 and also comprising transmitting additional data relating to said payment card transaction and wherein said additional data includes at least one identifier useful for associating NFC data and non-NFC data pertaining to the same transaction.

13. A method for effecting a card-present payment card transaction according to claim 12 and wherein said transmitting additional data relating to said payment card transaction comprises transmitting said additional data via non-NFC communication.

14. A card-present payment facilitating system according to claim 10 and wherein said NFC-enabled mobile communicator is operative to transmit said data derived from said handwritten human signature to said NFC-enabled communicator when said NFC-enabled communicator and said NFC-enabled mobile communicator are not in NFC propinquity.

* * * * *